Patented Dec. 30, 1952

2,623,825

UNITED STATES PATENT OFFICE 2,623,825

DRY BREADING AND BATTER MIXES

Donald K. Tressler, Westport, Conn., and Paul T. Breithaupt, Scarborough, Ontario, Canada; said Tressler assignor to said Breithaupt No Drawing. Application August 1, 1950, Serial No. 177,132

3 Claims. (Cl. 99—94)

This invention relates to breading and batter mixtures for use primarily in the frying of certain foods such as fish, meats and the like.

An important object of the invention is to provide a novel dry mixture of this character which greatly reduces the drying out of the foods during cooking, which improves the taste of the food and which gives it a better appearance, particularly in that it gives it a rich brown crust which also tends to hold the pieces together.

Another object of the invention is to provide a breading mix which is especially useful in the frying of fish in that it largely eliminates or at least greatly reduces the characteristic odor developed by fish during frying. In the case of freshly caught fish the "fishy" odor is substantially completely eliminated and there is a marked reduction of the odor in the case of cold storage fish or fish which has been frozen for a considerable period of time.

Also, in the case of certain meats, notably pork chops and mutton chops which develop characteristic odors during frying, the odor is considerably reduced and the flavor and the appearance of the cooked product is greatly improved.

The breading mix of the present invention is also highly effective if incorporated in stuffing for poultry and fish in that it removes the "gutty" flavor or odor. It is a dry powdered or comminuted product which sticks to the fish or other food which is rolled in it. The batter mix is substantially similar to the breading mix except that like other batters, it is a fluid product and forms a unitary shell around the food which, when fried, holds in the juices, whereas in the case of the breading mix, the juices in part escape. The batter mix is, in effect, a solution of colloidal solids and because of its colloidal character it sticks to the fish or other food product and forms the unitary shell.

In accordance with the present invention there is added to the dry mixture, which may contain flour, milk solids, cracker meal and the like, a minor quantity of a dehydrated product which is first prepared as an aqueous solution containing a suspension or colloidal solution of pectin or protopectin having a pH value not more than 6. Sources of the pectin material are certain fruits and vegetables such as apples, pears, plums, tomatoes, citrus pulps, juices and skins and the like. Many of these pectin substances after cooking have a sufficiently high concentration of acid to give the desired result. In other instances, it is necessary to add an edible organic acid to reduce the pH value.

The product containing the pectin and acid should preferably be in the form of an aqueous solution wherein the pectin is in a finely divided state or colloidal solution. The dispersion in the aqueous medium may be effected by mechanical means such as by running the product through a colloid mill or homogenizer to reduce the particle size.

Apples and tomatoes are a convenient and relatively inexpensive source of the suspension of pectin or protopectin and if the pulpy mass obtained after cooking the apples in water, and adding of the tomato pulp, is run through an ordinary "finisher" water may be added and the material is ready for use. Sometimes, it may also be desirable to obtain even a smaller particle size in the solution by straining it through muslin after operation by the finisher. In other words, the cooked mass of the pectin substances contains a considerable amount of fibrous material which should either be comminuted or the fibrous material screened out as by the use of the muslin strainer.

In the event that apples are used, it is not necessary to utilize the higher grade product but, on the contrary, the immature apples, the windfalls and others of inferior grade may be employed. They also have the advantage of a relatively higher acidity than the mature product so it is usually not necessary to add any organic acid. Also, the peels, the cores, the crushed apples and so on may be used to make a suspension in the nature of a puree which is readily prepared by cooking the products with water for a sufficient time to obtain a pulpy mass.

An extract is prepared in much the same manner as the puree except that in the case of the extract the cooked mass is put through a very fine screen such as muslin to take out all the suspended solids whereas in the case of the puree the mass is run through a relatively coarse screen.

The mass may be dehydrated by any conventional method such as on a drum dryer, after which it is finely comminuted and is then incorporated into a dry mass containing a number of ingredients.

EXAMPLE I

Breading mix

| | Percent |
|---|---|
| General all-purpose flour | 37 |
| Dehydrated whole egg | 5.0 |
| Non-fat dry milk solids | 2.5 |
| Soybean flour (defatted) | 2.5 |
| Salt | 1.0 |
| Cracker meal | 50.0 |
| Dehydrated puree extract | 2.0 |

In making the breading mix, the crackers are made into meal by rolling soda crackers on a flat surface. All dry ingredients in addition to the apple extract powder are combined and thoroughly mixed. The egg powder tends to hold the fried mass together and the milk solids give it its desired golden color instead of a brown or black color which is much less desirable. Instead of the cracker meal, bread crumbs may be used. Either one tends to absorb the egg and milk and give the desired texture to the crust.

EXAMPLE II

*Batter mix*

| | Percent |
|---|---|
| General all-purpose flour | 73.44 |
| Salt | 1.11 |
| Phosphate baking powder | 1.67 |
| Dehydrated whole egg | 8.33 |
| Non-fat dry milk solids | 5.56 |
| Melted vegetable shortenings | 8.89 |
| Dehydrated puree or extract | 1.00 |

The dry ingredients that make up the dry batter mix are combined and thoroughly mixed. The shortening is then melted to 110° F. It is then slowly added to the dry ingredients, mixing constantly. The ingredients are sifted to make sure the fat is well blended.

When a batter is made, one cup of water is combined with about 4½ ounces of the dry batter mix. The fish, seafood, pork or chicken is then dipped in the batter and coated. The fish or meat is then fried in deep fat. The batter eliminates the cooking odors usually present and forms a unitary shell around the product.

The term "pectic substance" as used herein and in the appended claims is deemed to include pectin as a product, substances containing pectin and protopectin. In this connection, reference is made to a work entitled "Commercial Fruit and Vegetable Products," by W. V. Cruess, McGraw Hill, 1948, page 379, wherein it is stated that "A committee of the American Chemical Society in 1927 defined pectic substances as follows: Pectin includes the methylated substances useful in making jelly. Protopectin is the parent substance from which pectin is derived. Pectic acids are the substances formed on complete demethylation and complete or partial carboxylation of pectin."

It is to be understood that while the proportions of ingredients suggested in the several examples above given are of particular utility, important advantages inherent in the invention may be obtained by the omission of some of the ingredients and by using ingredients in other proportions. The invention is therefore not to be construed as limited to the precise ingredients or to the exact proportions illustrated and described, but within the scope of the appended claims, may vary within wide range.

What we claim is:

1. A batter mix for preventing the dehydration of foods during the cooking thereof, having therein a dehydrated puree extract prepared from an aqueous solution of a pectic substance, suspended in a colloidal state and having a pH value of not more than 6, consisting of the following in substantially the proportions set forth by weight:

| | Percent |
|---|---|
| General all-purpose flour | 70 |
| Salt | 1 |
| Baking powder | 1 |
| Dehydrated whole egg | 8 |
| Non-fat dry milk solids | 5 |
| Melted vegetable shortening | 9 |
| Dehydrated puree extract | 1 |

2. A mixture for preventing the dehydration of foods during the cooking thereof, having therein a dehydrated puree extract prepared from an aqueous solution of pectin suspended in a colloidal state and having a pH value of not more than 6, and consisting of the following in substantially the percentage set forth:

| | Percent |
|---|---|
| General all-purpose flour | 37.0 |
| Dehydrated whole egg | 5.0 |
| Non-fat dry milk solids | 2.5 |
| Defatted soybean flour | 2.5 |
| Salt | 1.0 |
| Cracker meal | 50.0 |
| Dehydrated puree extract | 2.0 |

3. A mixture for preventing the dehydration of foods during the cooking thereof, having therein a dehydrated puree extract prepared from an aqeous solution of pectin suspended in a colloidal state and having a pH value of not more than 6, consisting of:

| | Percent |
|---|---|
| General all-purpose flour | 73.44 |
| Salt | 1.11 |
| Phosphate baking powder | 1.67 |
| Dehydrated whole egg | 8.33 |
| Non-fat dry milk solids | 5.56 |
| Melted vegetable shortening | 8.89 |
| Dehydrated puree extract | 1.00 |

DONALD K. TRESSLER.
PAUL T. BREITHAUPT.

REFERENCES CITED

The following references are of record in the file of this patent:

UNITED STATES PATENTS

| Number | Name | Date |
|---|---|---|
| Re. 19,197 | Jameson | June 5, 1934 |
| 1,335,242 | Johnson | Mar. 30, 1920 |
| 1,368,022 | Chatfield | Feb. 8, 1921 |
| 1,795,980 | Wahl | Mar. 10, 1931 |